A. S. RICE.
WATER HEATING APPARATUS.
APPLICATION FILED DEC. 7, 1918.
1,323,551.
Patented Dec. 2, 1919.
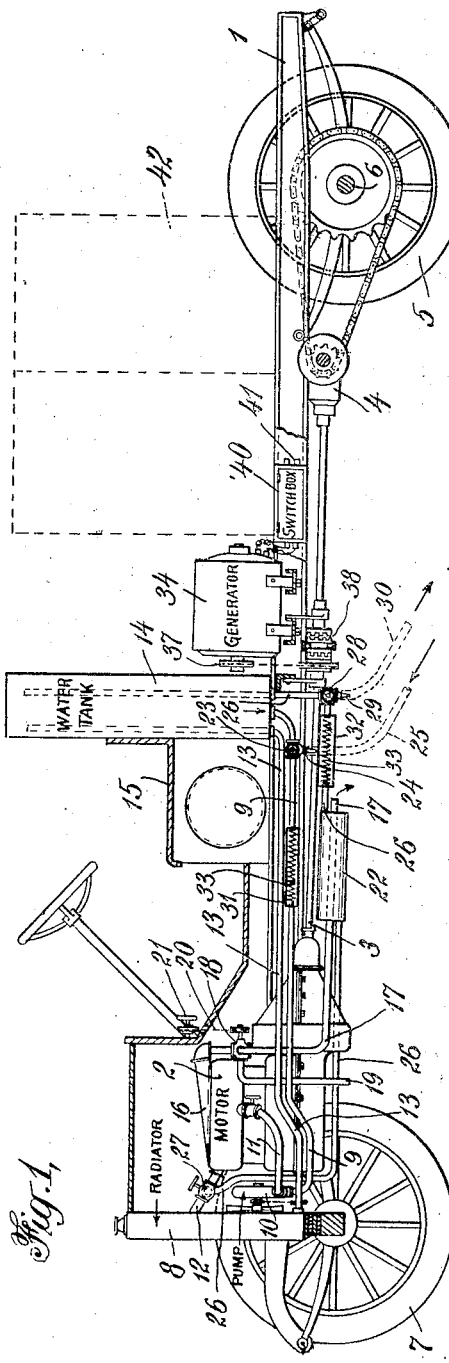
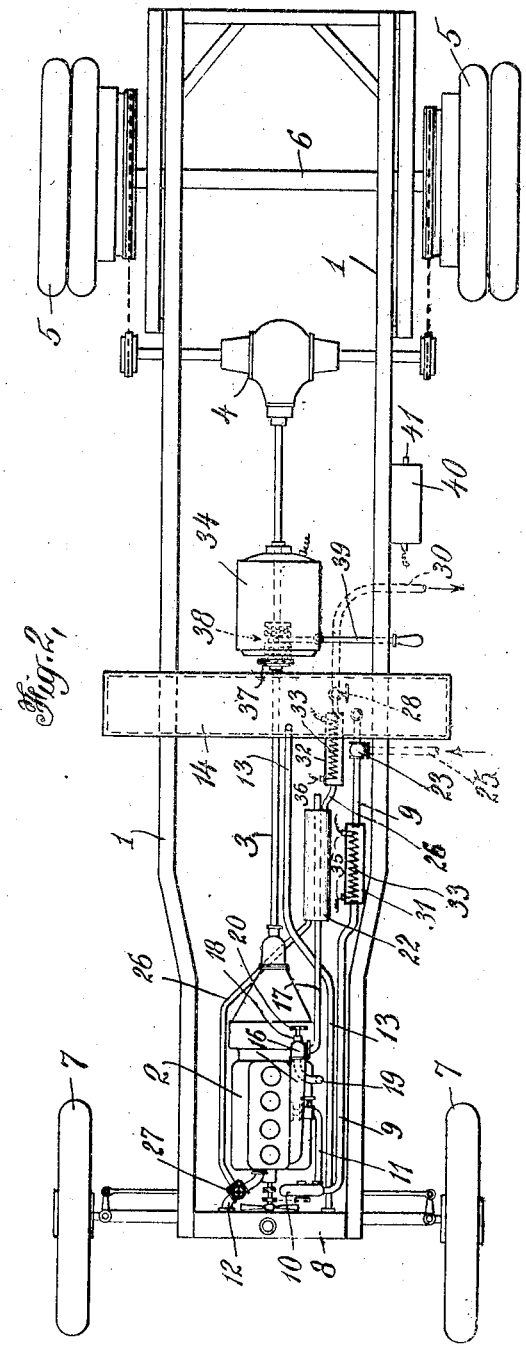
Inventor
A. S. Rice,
By his Attorneys

UNITED STATES PATENT OFFICE.

ANSON SHERMAN RICE, OF BROOKLYN, NEW YORK.

WATER-HEATING APPARATUS.

1,323,551.    Specification of Letters Patent.    Patented Dec. 2, 1919.

Application filed December 7, 1918. Serial No. 265,806.

*To all whom it may concern:*

Be it known that I, ANSON SHERMAN RICE, residing at Brooklyn, in the county of Kings, State of New York, have invented certain new and useful Improvements in Water-Heating Apparatus; and I do hereby declare the following to be full, clear, and exact description of the invention, such as will enable others skilled in the art to which it appertains to make and use the same.

The present invention relates to portable water heating apparatus; and it is directed primarily to an arrangement wherein the heat required is obtained from or through the agency of an internal combustion engine, both directly by utilization of the hot exhaust gases from the engine, and indirectly by means of one or more electrical resistance elements, the current supply for the latter being derived from a generator which is driven by the engine.

The invention particularly comprehends an improved water heating apparatus designed for mounting upon the chassis of an automobile truck of conventional form, and which may readily be applied thereto without entailing any disturbance or re-arrangement either of the usual driving mechanisms, or of the main members of the usual water circulating system, and without requiring the addition of any special, complicated or expensive parts. It further resides in the provision of improved controlling means for the piping system and the electric heaters intercalated therein, whereby hot water may be obtained instantaneously whenever desired, merely by regulating its course through said system, and whereby the hot gases from the engine may be cut into or out of the system at will, according as the truck is stationary or in motion; and it also comprises various other means and devices whereby the generator may be thrown into or out of action and the current supplied therefrom alternatively sent to the resistance elements or utilized in connection with suitable machinery or apparatus which may be mounted either upon the rear portion of the truck or upon a trailer connected thereto, or may be arranged by the side of the truck when the latter is standing still.

Other objects and advantages will appear as the following detailed description of the invention proceeds.

An embodiment of the said invention is illustrated in the accompanying drawing; but it is to be understood that while such embodiment may be regarded for all practical purposes as the one now preferred, yet the invention is not limited to the precise structural details thereof, but is susceptible of substantial modification and change within the scope as hereinafter claimed.

The aforesaid drawing represents in Figures 1 and 2 thereof, respectively, a somewhat diagrammatic sectional side elevation and a plan view of a motor driven truck equipped with the invention.

Referring more particularly to the drawing, the motor truck therein shown comprises a chassis having the usual side rails 1, internal combustion engine 2, transmission 3 leading from the engine to the differential rear drive 4, driving wheels 5 on the rear axle 6, steering wheels 7 and radiator 8, all of which parts are, or may be, of conventional form and operate in the ordinary way.

The water circulating system, which presents the more important features of the invention, as has already been stated, embodies an admission pipe 9 leading to the suction side of a pump 10, a pipe 11 leading from the discharge side of the pump to the water jacket of the engine, a pipe 12 leading from the engine to the radiator, and a return pipe 13 leading, in turn, from the radiator to a water tank 14, which is disposed transversely of the chassis and mounted thereon directly behind the driver's seat 15. The pump 10 is belted to the engine shaft as usual, and may be of any preferred character; and the engine is provided with the usual intake and exhaust manifolds, the latter of which is indicated at 16 and has connected to it an L-shaped exhaust pipe 17. The vertical arm of this pipe 17 is provided with a three-way valve 18, from the casing of which leads a depending branch pipe 19, said valve being preferably furnished with a suitable operating connection 20 whereby it may be actuated as desired from a device 21 on the floor of the truck adjacent the steering post. The long horizontal arm of pipe 17 extends through a heating drum 22, the purpose of which, as well as of the other pipes just mentioned, will be subsequently explained. The admission pipe 9 is provided adjacent tank 14 with a three-way valve 23, which is fitted with a depending nipple 24 for the attachment of one end of a hose pipe or similar connection 25 thereto. This connection is attachable at its opposite end to a hydrant or other source of water supply (not shown), and by virtue of such arrangement the water drawn through pipe 9 by the action of the pump may be supplied either from the hydrant or from the tank 14, according as one or the other of those elements is cut in by the valve. The radiator supply pipe 12 has connected to it a branch pipe 26, which leads rearwardly therefrom to the tank 14, and said pipe 12 is provided at the point where it joins the pipe 26 with a three-way valve 27, so that instead of the water flowing into the radiator from the engine, it may, if desired, be shunted through the branch pipe 26 into the tank. Directly adjacent said tank, this pipe 26 is equipped with a three-way valve 28 having connected to it a nipple 29 to permit the attachment of a hose section 30 or the like. The pipe 26 opens into one end of the heater 22 to supply water thereto, and leads from the other end of said heater to the tank, as above explained, being preferably interrupted at its points of union with the heater, to permit the water to fill said heater.

To heat the water to the required degree, there are advantageously employed, in addition to the above-mentioned exhaust gas heater 22, two electric heaters 31 and 32 to which the pipes 9 and 26, respectively, are connected. Each of these heaters may consist simply of a cylindrical drum or casing, which is closed at its opposite ends, and a resistance unit 33 contained therein, the current supply for the heaters being obtained from a generator 34, to which said heaters are connected by wires 35 and 36. The generator is suitably mounted in the chassis above the transmission 3, from which latter it is driven by means of a gear connection 37 which includes a two-way clutch 38, the shiftable element of the clutch being operated by a lever 39 and being preferably so constructed and arranged as to alternately couple the generator and the differential rear drive 4. Consequently, when the truck is in motion, the movement of the engine is transmitted to, and operates, the rear drive 4; and when it is standing still, the engine is utilized to drive the generator. The latter is wired to a switch box 40, containing switches and sockets (not shown) of the usual character, and also equipped at one end with a connecting plug 41, from which the current may be taken off and supplied to cooking, laundry or other apparatus or machinery. Such apparatus may be mounted upon the rear portion of the truck, as indicated diagrammatically at 42 in dotted lines in Fig. 1, or it may be arranged either at the side of the truck or upon a trailer connected thereto, specific illustration being considered unnecessary as involving no part of the actual invention.

The normal course of the water through the piping system, assuming that the truck is standing still, with the engine running, the radiator cut out, and the transmission coupled to drive the generator, is as follows: Water is drawn in, from the hydrant or other source of supply, through the hose pipe 25 and admission pipe 9, and passes to the inlet side of the pump 10, leaves said pump from the discharge side thereof and flows through pipe 11 into the engine, being supplied to the latter in a slightly heated state, if desired, due to its passage through the heater 31. From the engine, the water flows through the pipe 12 into the branch pipe 26, and thence into the tank 14, passing through the exhaust heater 22 and the other electric heater 32 on its way to the tank, so that it is highly heated by the time that it reaches said tank. It will be understood, however, that the extent to which the two resistance units are heated may be varied by regulating the flow of current therethrough by means of controlling devices, and that the exhaust may, if desired, be permitted to escape through the pipe 19 by suitably manipulating the valve 18, instead of entering the pipe 17 which leads to the exhaust heater. According to the operation just described, a constant flow of water from the source of supply to the tank occurs, which may be kept up as long as desired, or until the tank is completely filled. Thereafter, the valve 23 may be adjusted to connect the admission pipe 9 directly to the tank, cutting out the hydrant and the hose pipe 25, and the water will then circulate in a closed path, returning from the tank to the pump by way of the admission pipe 9 until the entire contents of the tank become heated to the required degree. Hot water may then be drawn directly from the tank as needed, upon proper manipulation of the valves. When instantaneous heating is required, the valve 28 is adjusted to cut out the tank, whereupon the water, on leaving the heater 32, can be drawn off through the hose pipe 30, instead of entering the tank through pipe 26.

When the truck is in motion the generator will then be cut out, and the water will circulate in the manner usual in cooling systems, from the tank through pipe 9 to the pump, thence through pipe 11 to the engine, and from the latter through the pipe 12 to the radiator, returning to the tank by way of pipe 13. At such time, the valve 27 will have been adjusted to cut out the branch pipe 26, and the valve 18 to cut out the exhaust heating pipe 17.

By utilizing a generator in the manner above described, the load on the engine, and, consequently, the heat derived therefrom, will be increased, and current obtained which may be employed for heating purposes in addition to the heat produced by the engine. The current may also be utilized for lighting purposes, as well as for operating apparatus or machinery of the afore-mentioned character, and it may be put to still other uses as well. In the case of laundry or cooking apparatus, such may, as stated, be mounted either upon the truck or upon a trailer connected thereto, and may have any suitable construction. Portable tubs and showers may also be installed on the truck or on a trailer, in place of the apparatus just mentioned, and may be connected up with the water system to be supplied thereby with both hot and cold water; but in that instance, an auxiliary pump, driven from the generator, is preferably made use of, in order to obtain a larger volume of water than that obtained from the circulating pump.

The pipes 9 and 26 may be, and preferably are, interrupted at their points of union with the two electric heaters 31 and 32, in order to permit the water to circulate freely around the resistance units comprised in said heaters. The effect, however, is substantially the same as if the pipes led uninterruptedly through the heaters, and for that reason the aforesaid pipes are virtually encircled or inclosed by the heaters and will be so described in certain of the appended claims.

I claim as my invention:

1. In a water heating system, the combination, with an internal combustion engine; of a water supply pipe; a pump driven from the engine and to which said supply pipe leads; a pipe leading from said pump to said engine; a water discharge pipe leading from the engine; an electric generator connected to be driven by the engine so as to increase the load on the engine and the heat derived therefrom; a heating drum intercalated in said discharge pipe; and a resistance unit electrically connected with said generator and disposed within said drum.

2. In a water heating system, the combination, with an internal combustion engine; of a water supply pipe; a pump driven from the engine and to which said supply pipe leads; a pipe leading from said pump to said engine; a water discharge pipe leading from the engine; an electric generator connected to be driven by the engine so as to increase the load on the engine and the heat derived therefrom; a pair of separate heating drums connected to said discharge pipe at different points, one of said drums being also connected to the exhaust pipe of the engine to permit the exhaust gases to pass through said drum and to heat the water flowing through the discharge pipe; and a resistance unit connected to the generator and disposed within the other drum.

3. In a water heating system, the combination, with an internal combustion engine, and a radiator having a pipe connection therewith; of a water supply pipe; a pump driven by the engine and to which said supply pipe leads; a pipe leading from said pump to the engine; a discharge pipe communicating with said pipe connection; a heater intercalated in said discharge pipe; a tank from which said supply pipe leads and to which said discharge pipe leads; a return pipe connecting said radiator and said tank; and a valve associated with the said pipe connection for alternatively cutting said discharge pipe and said radiator into the system.

4. In a water heating system, the combination, with an internal combustion engine, and a radiator having a pipe connection therewith; of a water supply pipe; a pump driven by the engine and to which said supply pipe leads; a pipe leading from said pump to the engine; a discharge pipe communicating with said pipe connection; a heater intercalated in said discharge pipe; and a valve in said pipe connection for cutting in either said discharge pipe or said radiator and cutting out the other.

5. In a water heating system, the combination, with an internal combustion engine; of water supply and discharge pipes connected thereto; a heater intercalated in the discharge pipe; and a single means for increasing the load on the engine and the heat derived therefrom and for supplying a heating medium to said heater.

6. In a water heating system, the combination, with an internal combustion engine; of water supply and discharge pipes connected thereto; a heater through which the discharge pipe extends; and a single means for varying the load on the engine and the heat derived therefrom and for controlling the activity of the heater.

7. In a water heating system, the combination, with an internal combustion engine; of water supply and discharge pipes connected thereto; a heating drum through which the discharge pipe extends containing a resistance unit; and a single means for varying the load on said engine and for supplying current to said resistance unit.

8. In a water heating system, the combination, with an internal combustion engine; of water supply and discharge pipes connected thereto; a pair of separate heating drums through which the supply and discharge pipes extend, each drum containing a resistance element; and an electric generator connected to be driven by the engine for increasing the load thereon and the heat derived therefrom and for supplying current to said resistance elements.

9. In an automobile, the combination, with a chassis, and an internal combustion engine and a cooling system therefor mounted on the chassis, said cooling system comprising a radiator, water supply and discharge pipes leading to and from the engine, and a pipe connection between the engine and the radiator and with which the discharge pipe communicates; of a valve for cutting said radiator out of the system; a generator mounted on the chassis; means for connecting and disconnecting the generator with and from the engine, said generator, when connected to the engine, serving to increase the load on the said engine and the heat derived therefrom; and an electric heater for one of the pipes in said system supplied with current by said generator.

10. In an automobile, the combination, with a chassis, and an internal combustion engine and a water circulating system mounted on the chassis, said system including a radiator; of means for cutting the radiator out of said system; and means operable to electrically heat the water during its passage through said system when the radiator is cut out.

11. In an automobile, the combination, with a chassis, an internal combustion engine mounted thereon, and a water circulating system comprising a radiator and in which the engine is included; of means for cutting the radiator out of said system; and a single means operable to increase the load on the engine and the heat derived therefrom, and to electrically heat the water during its passage through said system when the radiator is cut out.

12. In an automobile, the combination, with an internal combustion engine; of a water circulating system comprising supply and discharge pipes leading to and from the engine, a water tank from and to which said supply and discharge pipes respectively lead, and a water circulating pump; a branch outlet pipe leading from said discharge pipe; heating means disposed in advance of said outlet pipe and through which the discharge pipe extends; and means associated with said outlet pipe for cutting the same into communication with said discharge pipe and for cutting out said tank when instantaneous hot water is required.

13. In an automobile, the combination, with an internal combustion engine; of a water circulating system comprising supply and discharge pipes leading to and from the engine, a water tank from and to which said supply and discharge pipes respectively lead, and a water circulating pump; a branch outlet pipe leading from said discharge pipe; an electric heater encircling said discharge pipe and located in advance of said outlet pipe; a generator driven by the engine for supplying current to said heater; and a three-way valve located at the junction of said discharge and outlet pipes for alternatively cutting into the system the outlet pipe and the tank.

14. In an automobile, the combination, with an internal combustion engine; of a water circulating system comprising supply and discharge pipes leading to and from the engine, a radiator connected with the discharge pipe, a water tank from and to which said supply and discharge pipes respectively lead, a return pipe leading from the radiator to said tank and a circulating pump; a branch outlet pipe leading from said discharge pipe; a three-way valve for establishing communication between the engine and the radiator and discharge pipe alternatively; an electric generator driven from the engine; an electric heater inclosing said discharge pipe in front of the outlet pipe and supplied with current by said generator; and a three-way valve located at the junction of the discharge and outlet pipes for alternatively cutting out the outlet pipe and the tank from the system.

15. In an automobile, the combination, with an internal combustion engine; of a water circulating system in which the engine is included; a heater associated with one of the pipes thereof; means controlled by the engine for supplying a heating medium to said heater; a branch outlet pipe connected to the heated pipe in rear of the heater; and valve means for directing the flow of heated water into said outlet pipe when instantaneous hot water is required.

16. In an automobile, the combination, with an internal combustion engine; of a water circulating system in which the engine is included; an electric heater connected to one of the pipes thereof; an electric generator driven by the engine for supplying current to said heater; a branch outlet pipe connected to the heated pipe in rear of the heater; and valve means for directing the flow of heated water into said outlet pipe when instantaneous hot water is required.

17. In an automobile, the combination, with an internal combustion engine; of a water circulating system in which the engine is included; a pair of separate heating drums encircling one of the pipes thereof at different points, one drum having the exhaust pipe of the engine leading therethrough, and the other drum containing a resistance unit; an electric generator driven by the engine for supplying current to said resistance unit; a branch outlet connected to the heated pipe in rear of said heaters;

and valve means for directing the flow of heated water into said outlet pipe when instantaneous hot water is required.

18. In an automobile, the combination, with a chassis, and an internal combustion engine mounted thereon; of a water circulating system in which the engine is included; an electric heater connected to one of the pipes thereof; an electric generator driven by the engine for supplying current to said heater; and a switch box attached to the chassis and electrically connected with the generator, said switch box having current take-off devices secured to it.

In testimony whereof I affix my signature.

ANSON SHERMAN RICE.